(12) United States Patent
Jones

(10) Patent No.: US 9,121,541 B2
(45) Date of Patent: Sep. 1, 2015

(54) PORTABLE DEVICE SUPPORT AND ORGANIZER SYSTEM AND METHOD

(76) Inventor: Terry G. Jones, Austin, TX (US)

(*) Notice: Subject to any disclaimer, the term of this patent is extended or adjusted under 35 U.S.C. 154(b) by 473 days.

(21) Appl. No.: 13/220,108

(22) Filed: Aug. 29, 2011

(65) Prior Publication Data
US 2012/0112020 A1 May 10, 2012

Related U.S. Application Data

(60) Provisional application No. 61/411,723, filed on Nov. 9, 2010.

(51) Int. Cl.
*F16M 13/00* (2006.01)
*F16M 13/02* (2006.01)

(52) U.S. Cl.
CPC ............... *F16M 13/00* (2013.01); *F16M 13/02* (2013.01)

(58) Field of Classification Search
CPC ..... F16M 13/00; F16M 13/02; F16M 13/022; B60R 11/0241; B60R 11/0252; B60R 2011/0075
USPC .............. 248/441.1, 116, 451, 152, 918, 450, 248/453, 311.2, 146, 443, 444, 176.1; 211/26.2, 41.7, 66; D13/108; 224/929, 224/930, 571, 679; 206/305, 320; D14/251–253, 224, 216, 447; 220/737, 220/3.9, 4.02
See application file for complete search history.

(56) References Cited

U.S. PATENT DOCUMENTS

| | | | | |
|---|---|---|---|---|
| 1,812,318 A | * | 6/1931 | Bower | 211/37 |
| 3,306,308 A | * | 2/1967 | Shanok et al. | 131/260 |
| 3,809,352 A | * | 5/1974 | Mathias | 248/444.1 |
| D247,999 S | * | 5/1978 | Whatley | D6/536 |
| 4,708,239 A | * | 11/1987 | Bourbon | 206/45.23 |
| 4,984,760 A | * | 1/1991 | Cohn et al. | 248/126 |
| 6,003,831 A | * | 12/1999 | Coleman | 248/688 |
| 6,129,323 A | * | 10/2000 | Mandokoro et al. | 248/453 |
| 6,357,641 B1 | * | 3/2002 | Cheng | 224/242 |
| D469,073 S | * | 1/2003 | Muenscher et al. | D14/149 |
| 6,729,518 B2 | * | 5/2004 | Badillo et al. | 224/578 |
| 6,745,403 B2 | * | 6/2004 | Sajovic | 2/161.8 |
| D510,517 S | * | 10/2005 | Noack | D8/373 |
| 6,971,205 B2 | * | 12/2005 | Woodruff | 47/65.5 |
| 6,981,682 B2 | * | 1/2006 | Kind | 248/444 |
| D526,357 S | * | 8/2006 | Killinger et al. | D19/90 |
| D537,805 S | * | 3/2007 | Haney | D14/148 |
| D545,812 S | * | 7/2007 | Grady et al. | D14/217 |
| D557,570 S | * | 12/2007 | Shamoon et al. | D7/637 |
| D579,729 S | * | 11/2008 | Pourounidis et al. | D7/637 |
| D600,680 S | * | 9/2009 | Mead et al. | D14/217 |

(Continued)

*Primary Examiner* — Jonathan Liu
*Assistant Examiner* — Guang H Guan
(74) *Attorney, Agent, or Firm* — The Law Firm of H. Dale Langley, Jr., P.C.

(57) ABSTRACT

A system for supporting a portable electronic device atop a surface includes a planar back side having a top and a bottom for resting on the surface in use, a front side having an upper edge connected to the top of the planar back side, forming an angle between the planar back side and the front side, and a bottom edge, and a cupped bottom connected to the bottom edge, the cupped bottom extending from the front side opposite the angle, and the cupped bottom for resting on the surface in use. The portable electronic device, in use with the system, rests on the cupped bottom and against the front side. An opening formed in the front side and an opening formed in the back side accommodate a cord of the portable electronic device. The back side includes a retainer for the cord.

13 Claims, 3 Drawing Sheets

(56) References Cited

U.S. PATENT DOCUMENTS

| | | | | |
|---|---|---|---|---|
| D601,300 S | * | 9/2009 | Burk | D28/18 |
| 7,584,841 B2 | * | 9/2009 | Chan et al. | 206/45.23 |
| D616,431 S | * | 5/2010 | Hijmans | D14/253 |
| D618,692 S | * | 6/2010 | Deutsch et al. | D14/447 |
| 7,770,864 B2 | * | 8/2010 | Phifer et al. | 248/455 |
| 7,784,750 B2 | * | 8/2010 | Burk | 248/176.2 |
| D636,395 S | * | 4/2011 | Anderson et al. | D14/434 |
| D640,708 S | * | 6/2011 | Lee | D14/447 |
| D647,881 S | * | 11/2011 | Warner | D14/217 |
| D658,167 S | * | 4/2012 | Buesseler et al. | D14/251 |
| D662,082 S | * | 6/2012 | McManigal | D14/217 |
| D666,174 S | * | 8/2012 | Du et al. | D14/217 |
| D670,296 S | * | 11/2012 | Seehoff | D14/447 |
| 8,333,353 B1 | * | 12/2012 | Silverman et al. | 248/205.6 |
| D676,054 S | * | 2/2013 | Izen et al. | D14/447 |
| D676,055 S | * | 2/2013 | Izen et al. | D14/447 |
| 8,517,318 B2 | * | 8/2013 | Burk | 248/176.2 |
| D693,826 S | * | 11/2013 | Ashida et al. | D14/447 |
| 8,631,934 B2 | * | 1/2014 | Chun | 206/320 |
| D703,676 S | * | 4/2014 | Smith et al. | D14/447 |
| 8,888,058 B2 | * | 11/2014 | Zaharakis et al. | 248/176.1 |
| 2001/0030272 A1 | * | 10/2001 | Moore | 248/441.1 |
| 2006/0111076 A1 | * | 5/2006 | Davie et al. | 455/347 |
| 2007/0249412 A1 | * | 10/2007 | Fan et al. | 455/569.2 |
| 2011/0068245 A1 | * | 3/2011 | Livingston et al. | 248/460 |
| 2011/0134601 A1 | * | 6/2011 | Sa | 361/679.43 |
| 2012/0112020 A1 | * | 5/2012 | Jones | 248/121 |
| 2013/0098789 A1 | * | 4/2013 | Jun et al. | 206/320 |

* cited by examiner

PORTABLE DEVICE SUPPORT AND ORGANIZER SYSTEM AND METHOD

CROSS-REFERENCE TO RELATED APPLICATIONS

This application is a conversion of and claims benefit of priority of U.S. Provisional Patent Application Ser. No. 61/411,723, filed Nov. 9, 2010, titled "Portable Device Support and Organizer System and Method", of Terry G. Jones, which provisional application has at least one same inventor of the present application. The provisional application is hereby incorporated herein by this reference.

TECHNICAL FIELD

The present disclosure relates generally to portable device accessories, and, more particularly, relates to device supports and organizers for retaining, displaying, powering, charging, connecting and organizing a handheld portable electronic device unit when located on a desk or table top.

BACKGROUND

Handheld portable electronic devices, such as cellular phones, personal digital assistants, portable audio and video players (e.g., .mp3, .mp4, .wav, .wma and similar formats), are widely varied in design and configuration. The devices are typically connectable by power, data and/or other tether or cord for charging, or when connecting for wired communication with other electronic components. These portable electronic devices often include one or more receptacles for receiving a plug for connecting the tether/cord. The plug location on the device, as well as the design character/type of the plug (e.g., Universal Serial Bus (USB), mini-USB, or other standard or proprietary configuration), is often unique in each different type, model, brand, and other characteristic of these devices. Certain portable devices may employ a cradle or other unitized system for retaining the device during storage, charging, or the like. These cradle systems are sometimes designed uniquely for use with a particular device or type of device, or else of more universal design suitable for more than one type of the devices.

In any event, conventional cradle systems for handheld portable electronic devices have been suitable for only specific devices of particular design and configuration. Because the design and configuration among different types of devices tends to vary widely, only certain cradle systems may be suitable for accepting the device and attached tethers, cords, structures, and features. Even in those more universally designed cradle systems suitable for more than one type of the devices, cradle designs have been of limited acceptance. Certain problems presented by the conventional designs include ineffective positioning of the device in connection to the cradle, lack of suitable or desirable connectivity of the device with the cradle and tether/cord features, inaccessible location of connectors maintained by or included in the cradle, and lack of cord/tether organization, and others.

It would, therefore, be desirable to provide new and improved supports and organizers for electronic portable devices, for example, cellular telephones and PDAs. It would also be desirable to provide supports and organizers more universally useable with a variety of types, configurations, and designs of these portable devices.

SUMMARY

An embodiment of the invention is a support and organizer system for an electronic portable device. The system includes a first side having an upper extent and a lower extent, formed with a centrally disposed first opening, a second side having an upper extent and a lower extent, formed with a centrally disposed second opening and a peripheral notch of the second opening, the upper extent of the second side is connected to the upper extent of first side, a bottom cup portion connected to the lower extent of the first side, and a foot connected to the lower extent of the second side.

Another embodiment of the invention is a cradle for an electronic device connectable to a cord. The cradle includes a generally inverted V-shaped structure forming a first side and a second side, the first side having a generally centralized first opening for accommodating the cord, the second side having a generally centralized second opening for accommodating the cord, the second opening formed with a retainer for holding the cord in the second opening, a foot extending from the second side for supporting the structure, and an arcuately formed semi-spherical cup portion extending from the second side for supporting the electronic device.

Yet another embodiment of the invention is a method of manufacture of an organization system for a tethered device. The method includes providing a first side having an upper extent and a lower extent, forming a centrally disposed first opening in the first side, providing a second side having an upper extent and a lower extent, forming a centrally disposed second opening and a peripheral notch of the second opening in the second side, connecting the upper extent of the second side to the upper extent of first side, and providing a bottom cup portion to the lower extent of the first side.

Another embodiment of the invention is a method of manufacture of a cradle for an electronic device connectable to a cord. The method includes forming a generally inverted V-shaped structure forming a first side and a second side, forming a generally centralized first opening in the first side to accommodate the cord, forming a generally centralized second opening in the second side to accommodate the cord, forming a retainer for the cord in the second opening, and forming a semi-spherical extension of the second side for supporting the electronic device.

A further embodiment of the invention is a system for use with a portable electronic device. The system includes a first planar segment having a first top and a first bottom, the first bottom for underside support of the system resting atop a surface in use, a second planar segment having a second top and a second bottom, the second top is connected to the first top forming an inverted V-shape of the first planar segment and the second planar segment, and a generally laterally extending ledge, connected to the second planar segment at the second bottom, for supporting the portable electronic device resting adjacent the second planar segment opposite the first planar segment, and for underside support of the system resting atop the surface in use.

Another embodiment of the invention is a system for supporting a portable electronic device atop a surface. The system includes a planar back side having a top and a bottom for resting on the surface in use, a front side having an upper edge connected to the top of the planar back side, forming an angle of about 10° to about 45° between the planar back side and the front side, and a bottom edge, and a cupped bottom connected to the bottom edge, the cupped bottom extending from the front side opposite the angle, and the cupped bottom for resting on the surface in use. The portable electronic device, in use with the system, rests on the cupped bottom and against the front side.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
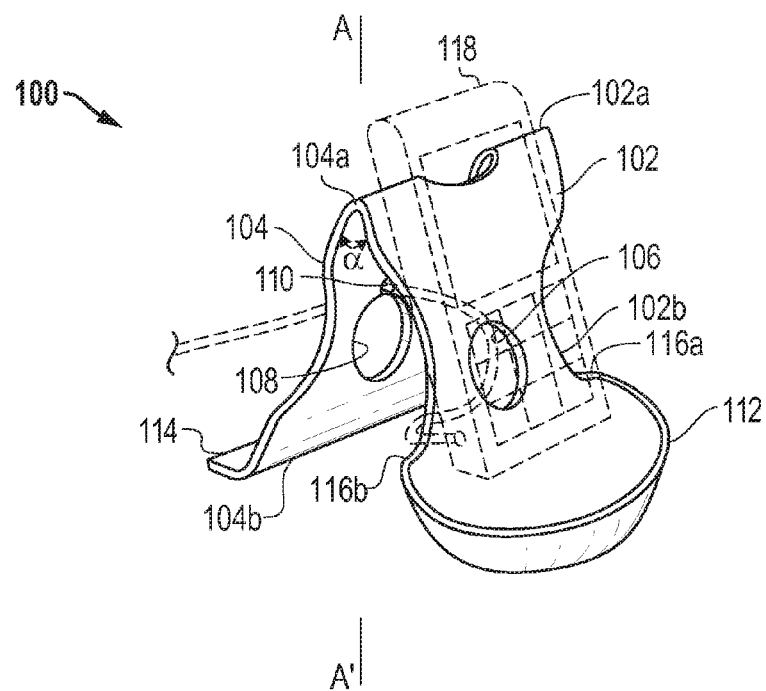
FIG. 1 illustrates a perspective view of a system for supporting and organizing and electronic portable device, for example, a cellular telephone, according to certain embodiments of the invention.
Figure 2:
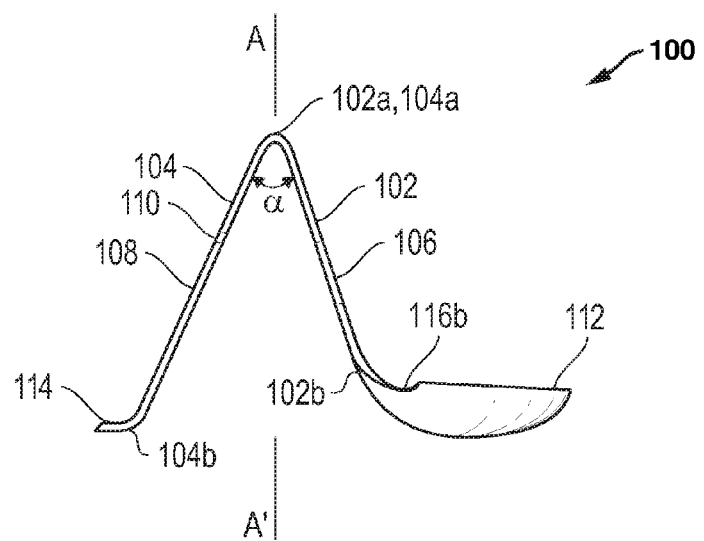
FIG. 2 illustrates a side view of the system of FIG. 1, as viewing from the left side of the system of FIG. 1, certain embodiments of the invention.
Figure 3:
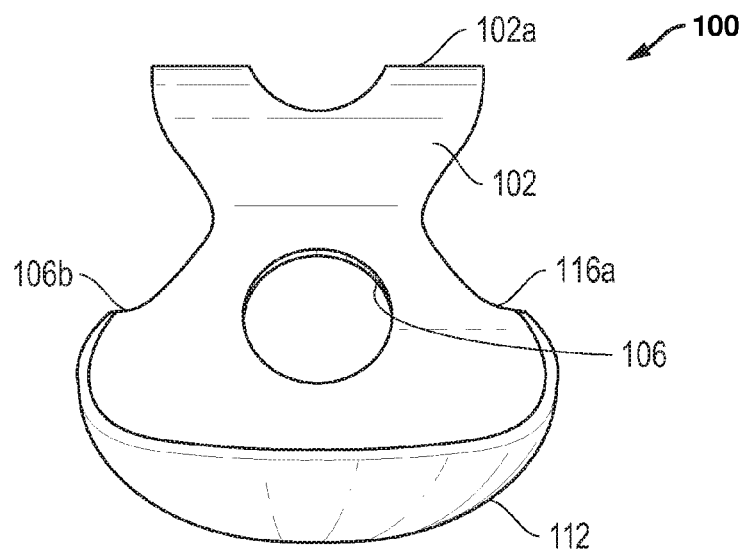
FIG. 3 illustrates a front view of the system of FIG. 1, according to certain embodiments of the invention.
Figure 4:
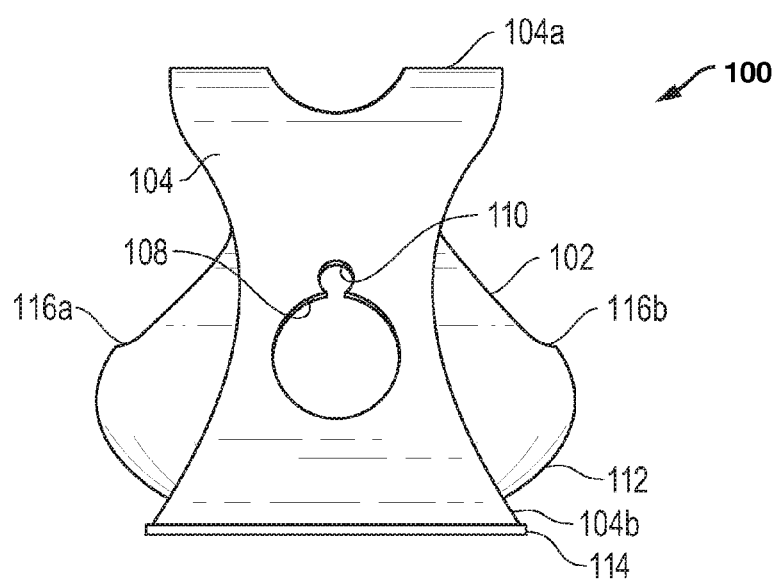
FIG. 4 illustrates a back view of the system of FIG. 1, according to certain embodiments of the invention.

Referring to FIG. 1, a support and organizer system 100 includes a first planar side 102 having a first top 102a and a first bottom 102b. The system 100 also includes a second planar side 104 having a second top 104a and a second bottom 104b. The first top 102a and the second top 104a connect forming an angle α (i.e., with vertex at connection of the first top 102a and the second top 104a) of about 10° to about 45°, preferably about 15° to about 25°, between the first planar side 102 and the second planar side 104.

The first planar side 102 is formed generally centrally with a first opening 106 of size sufficient to accommodate passage of a cord or tether (shown in phantom in FIG. 1). The second planar side 104 is also formed generally centrally with a second opening 108 of similar size to accommodate the cord or tether. The second opening 108 has a notch 110 formed in the second planar surface 102, peripherally connected to the second opening 108. The notch 110 is sufficient to accommodate, yet retain within the notch 110 by compression of the second planar surface 104, the cord or tether passing through the notch 110 and second opening 108.

The system 100 also includes an arcuately formed semi-spherical cup portion 112 connected to the first bottom 102b. The cup portion 112 extends in a direction nearing perpendicular to a vertical axis A-A' when the second bottom 104 and the cup portion 112 rest on a horizontal surface, such as a desk or table top, with the first top 102a and the second top 104a extending upwardly forming an inverted "V" shape with the planar sides 102, 104 forming the sides of the inverted "V".

Additionally, the system 100 includes a foot 114 connected to the second bottom 104b. As connected, the foot 114 extends in a direction substantially perpendicular to the vertical A-A' when the first bottom 102b and second bottom 104b are located on the horizontal surface as just described. The foot 114 extends from the second planar side 104 along a portion of the horizontal surface, and the cup portion 112 extends from the first planar side 102 in opposing direction, each away from the angle α between the first planar side 102 and the second planar side 104.

In the embodiments of FIGS. 1-4, the cup portion 112 is formed with recesses 116a, b, on each respective side of the cup portion 112 where connected to the first bottom 102b of the first planar side 102. The recesses 116a, b are sized to accommodate an edge of a portable electronic device 118 (shown in phantom) cradled in the system 100.

In operation, a tether or cord (shown in phantom in FIG. 1) is passed from the second planar side 104 adjacent the foot 114, through the second opening 108 and the first opening 106 (in space of the inverted "V" between the first side 102 and the second side 104), and out the first opening 106 in the vicinity of the cup portion 112. The portable electronic device 118 is connected to the tether or cord, and rested in the cup portion 112 of the system 100. For example, the portable electronic device is positioned to outwardly display when rested against the first planar side 102 and in the cup portion 112. The recesses 116a, b provide a horizontal ledge which may be employed for resting a bottom end of the portable electronic device. For example, the portable electronic device may be positioned upright, on its side, or in other positions against the first planar side 102 and within the cup portion 112 and/or recesses 116a, b.

Figure 5:
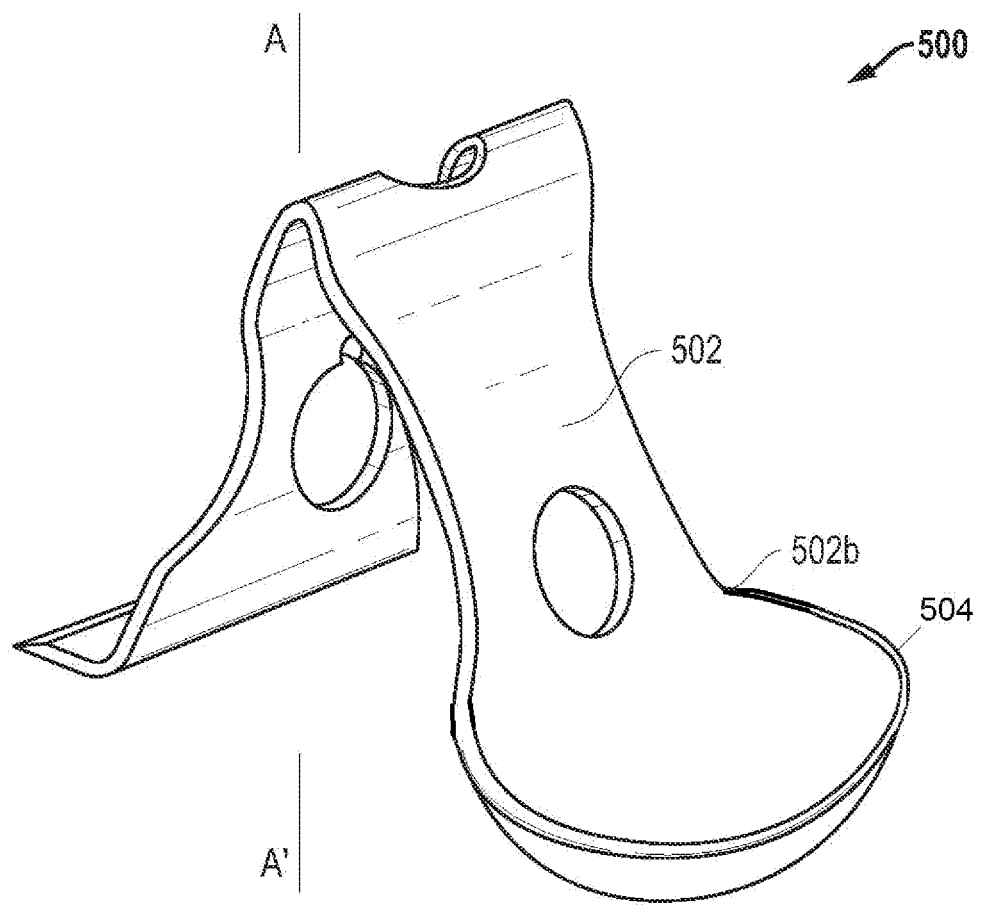
FIG. 5 illustrates a perspective view of an alternate system for supporting and organizing an electronic portable device, according to certain embodiments of the invention.

Referring to FIG. 5, an alternate system 500 includes the features of the embodiments of FIGS. 1-4, however, the cup portion 504 does not include any recesses and, instead, connects to a first planar side 502 by smooth line at a slight bend of a bottom portion 502b.

In other alternatives, the notch of the embodiments can be any other suitable retention mechanism for maintaining a tether, cord, or other linking line for the electronic device. For example, a slot, groove, or mechanical or elastic clasp can be included in the embodiments, either as alternative to the notch or in addition thereto. The embodiments are preferably manufactured of a unitized poly material, such as polysilicon or other malleable plastic or rubber. Other non-malleable or non-flexible materials could also be employed. Size, specifications, angles and other aspects of the embodiments may be as desired for a variety of applications and uses, including with other devices and types of devices.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Benefits, advantages, and solutions to problems have also been described above with regard to specific embodiments. The benefits, advantages, solutions to problems and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for supporting and organizing a tetherable device atop a generally planar surface, comprising:

a first side having an upper extent and a lower extent, formed with a centrally disposed first opening;

a second side having an upper extent and a lower extent, formed with a centrally disposed second opening and a peripheral notch of the second opening, the upper extent of the second side is connected to the upper extent of the first side, wherein the first side and the second side form a generally inverted V-shaped structure during use;

a foot extending laterally from the lower extent of the second side opposing the first side, the foot is configured to contact the generally planar surface in use; and a bottom arcuately formed semi-spherical cup portion connected to the lower extent of the first side, extending laterally from the lower extent of the first side opposite the second side, a bottom of the bottom arcuately formed semi-spherical cup portion is configured to contact the generally planar surface in use.

2. A cradle adapted for an electronic device connectable to a cord, comprising:
- a generally inverted V-shaped structure forming a first side and a second side;
- the first side having a generally centralized first throughway opening;
- the second side having a generally centralized second throughway opening, the second throughway opening formed with a retainer;
- a foot extending laterally from the second side opposite the first side; and
- an arcuately formed semi-spherical cup portion extending laterally from the first side opposite the second side.

3. The cradle of claim 2, further comprising:
- a support recess formed of the first side adjacent the cup portion.

4. The cradle of claim 3, wherein the cradle is formed as a unit.

5. A method of manufacture of an organization system for a tethered device, comprising the steps of:
- providing a first side having an upper extent and a lower extent;
- forming a centrally disposed first throughway opening in the first side;
- providing a second side having an upper extent and a lower extent;
- forming a centrally disposed second throughway opening and a peripheral notch of the second throughway opening in the second side;
- connecting the upper extent of the second side to the upper extent of the first side;
- providing a foot to the lower extent of the second side opposite the first side; and
- providing a bottom cup portion to the lower extent of the first side opposite the second side.

6. The method of claim 5, further comprising the step of:
- forming a support recess of the first side adjacent the cup portion.

7. The method of claim 5, wherein the steps of the method are performed by molding.

8. The method of claim 5, wherein the organization system is molded as a unit.

9. A method of manufacture of a cradle adapted for an electronic device connectable to a cord, comprising the steps of:
- forming a generally inverted V-shaped structure forming a first side and a second side;
- forming a generally centralized first throughway opening in the first side;
- forming a generally centralized second throughway opening in the second side;
- forming a retainer in the second throughway opening;
- forming a foot extending from the second side opposite the first side; and
- forming a semi-spherical extension of the first side opposite the second side.

10. A system adapted for use with a portable electronic device, comprising:
- a first planar segment having a first top and a first bottom;
- a first throughway opening formed of the first planar segment;
- a second planar segment having a second top and a second bottom, the second top is connected to the first top forming an inverted V-shape of the first planar segment and the second planar segment;
- a second throughway opening formed of the second planar segment;
- a bottom arcuately formed semi-spherical cup portion extending from the first bottom of the first planar segment opposing the second planar segment; and
- a generally laterally extending ledge connected to the second planar segment at the second bottom opposing the first planar segment.

11. A system adapted for supporting a portable electronic device atop a surface, comprising:
- a planar back side having a top and a bottom;
- a back throughway formed by the planar back side, sufficient for a cord of the portable electronic device to pass through the planar back side;
- a tether retainer formed in the back throughway;
- a front side having an upper edge connected to the top of the planar back side, forming an angle of about 10° to about 45° between the planar back side and the front side, and a bottom edge;
- a front throughway formed by the front side, sufficient for the cord of the portable electronic device to pass through the front side;
- a foot extending from the second side opposite the angle; and
- a cupped bottom connected to the bottom edge, the cupped bottom extending from the front side opposite the angle.

12. The system of claim 11, wherein the system is unitarily formed polysilicon.

13. The system of claim 11, further comprising:
- recesses formed at the bottom edge along the cupped bottom.

* * * * *